Figure 1:
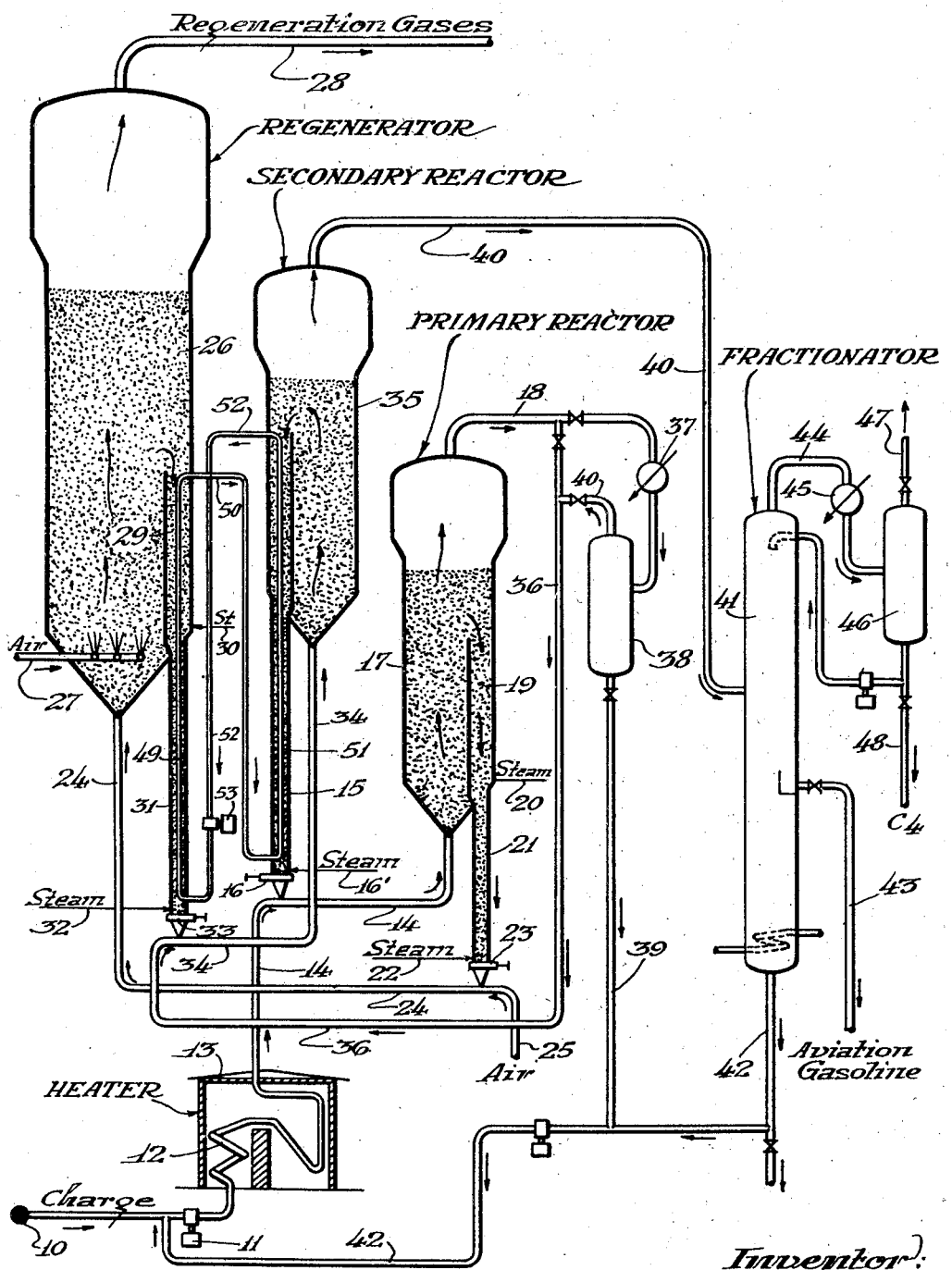

March 4, 1947.  M. H. ARVESON  2,416,730
MULTI-STAGE HYDROCARBON CONVERSION SYSTEM
Filed Feb. 27, 1942  3 Sheets-Sheet 3

Inventor:
Maurice H. Arveson
By Donald E. Payne
Attorney

Patented Mar. 4, 1947

2,416,730

UNITED STATES PATENT OFFICE 2,416,730

MULTISTAGE HYDROCARBON CONVERSION SYSTEM

Maurice H. Arveson, Flossmoor, Ill., assignor to Standard Oil Company, Chicago, Ill., a corporation of Indiana Application February 27, 1942, Serial No. 432,548

7 Claims. (Cl. 196—52)

This invention relates to multi-stage hydrocarbon conversion systems and it pertains more particularly to a two-stage system for the manufacture of aviation gasoline from hydrocarbons of the heavy naphtha to light gas oil boiling range by means of a fluid-type catalytic conversion system.

A fluid-type catalytic conversion system is one in which a powdered catalyst effects conversion while suspended in a gas or vapor stream. The catalyst is then separated from reaction gases and vapors, stripped with an inert gas such as steam, and suspended in a gas mixture for regeneration. The regenerated catalyst is then separated from regeneration gases and resuspended in the original gas or vapor stream for effecting further conversion. My invention relates to an improvement in this fluid-type catalytic conversion system wherein the powdered catalyst effects conversion in two separate zones at different temperature levels, the freshly regenerated catalyst being used at the lower temperature level to treat products produced at a higher temperature level with another portion of the catalyst.

The activity of catalysts for effecting various types of conversion depends not only on the type of catalyst employed and the relative freshness of the catalyst but depends also on the temperature at which conversion is effected. If a catalyst of the silica-alumina type is employed for the catalytic cracking of heavy naphtha or light gas oil at temperatures of the general order of 800 to 1000° F. the resulting products may be so olefinic and so low in octane number that they do not meet the stringent specifications of aviation fuel. If the products from this cracking step are subsequently treated with freshly regenerated catalyst at a temperature of the general order of 500 to 700° F. the catalyst evidently performs a different function and tends to effect polymerization, isomerization and perhaps a transfer of hydrogen from naphthenes to olefins so that the properties of the gasoline are remarkably improved and such products are made available for use as aviation fuel. An object of my invention is to provide improved methods and means for utilizing the same catalyst for effecting this secondary treating as is used for effecting the primary catalytic cracking. A further object is to provide improved methods and means for utilizing the heat of regeneration for supplying at least a part of the heat requirements for the cracking stage. A further object is to utilize the isomerizing, polymerizing and hydrogen transfer properties of the catalyst before such properties have been impaired by the contact of hydrocarbons with catalyst at high temperature.

A further object is to provide a new and improved combination of regeneration, catalyst cooling and low temperature treating steps whereby the cooled catalyst (which has heretofore been directly recycled to the regeneration zone for temperature control) may serve the additional function of increasing the paraffinicity and quality of cracked products before said catalyst is returned to the regeneration zone for effecting temperature control. A further object is to provide new and improved combinations of conversion chambers and heat exchange apparatus with the regeneration chamber. A further object is to provide a new and improved unitary system wherein the catalyst effects conversion in the secondary zone at low temperature and then effects primary conversion in another zone at high temperature. Other objects will be apparent as the detailed description of the invention proceeds.

In practicing my invention I cool regenerated catalyst to a temperature of the general order of 550 to 750° F., for example about 650° F. and utilize this cooled and freshly regenerated catalyst for a low temperature treating step. This step reduces the olefin content and increases the leaded antiknock value of products produced in a catalytic cracking step. In some embodiments of my invention the catalyst which has been used for effecting this low temperature treating is then separated from the final conversion products, heated to a temperature of the general order of 750 to 1000° F. and employed in a catalytic cracking zone to which the heavy naphtha or light gas oil vapors are charged. The low temperature treating step conditions the catalyst so that coke formation and charging stock degradation in this cracking step is reduced to a minimum. The primary reaction products from this cracking step are then passed to the lower temperature treating step and the spent catalyst from the cracking step is regenerated prior to its further use in the low temperature treating step.

A feature of the invention is the utilization of the heat of regeneration for effecting conversion in the cracking step. I may transfer heat from the freshly regenerated catalyst to the catalyst leaving the low temperature treating zone so that this last-named catalyst is heated to a temperature of the general order of 850 to 950° F. before it is dispersed in the incoming charging stock vapors. The freshly regenerated catalyst is thus cooled to a temperature of the general order of 550 to 750° F. before it meets the products from the primary cracking step for effecting the secondary isomerization treatment. If the products leaving the primary conversion step contain components which might condense under the conditions of the treating step such components may be removed therefrom and only the lighter hydrocarbons passed to the secondary lower temperature treating step.

By this stage-countercurrent process wherein the catalyst passes from a low temperature to a high temperature zone and products pass from a high temperature to a low temperature zone a gasoline may be obtained which is characterized by a much lower acid heat and a much higher leaded octane number for a given yield than in any single stage or multi-stage process heretofore known to the art.

Instead of transferring heat from freshly regenerated catalyst to catalyst leaving the low temperature treating zone I may cool a portion of the regenerated catalyst to the desired low temperature in a heat exchanger or waste heat boiler of the type heretofore employed for obtaining temperature control in the regenerator. Instead of recycling this cool regenerated catalyst directly back to the regenerator, however, I may introduce the cooled catalyst into the low temperature treating zone. The catalyst leaving this low temperature treating zone may either be returned directly to the regenerator for absorbing heat of regeneration or it may be admixed with hot catalyst from the regeneration zone for obtaining the desired temperature conditions in the cracking zone.

Figure 2:
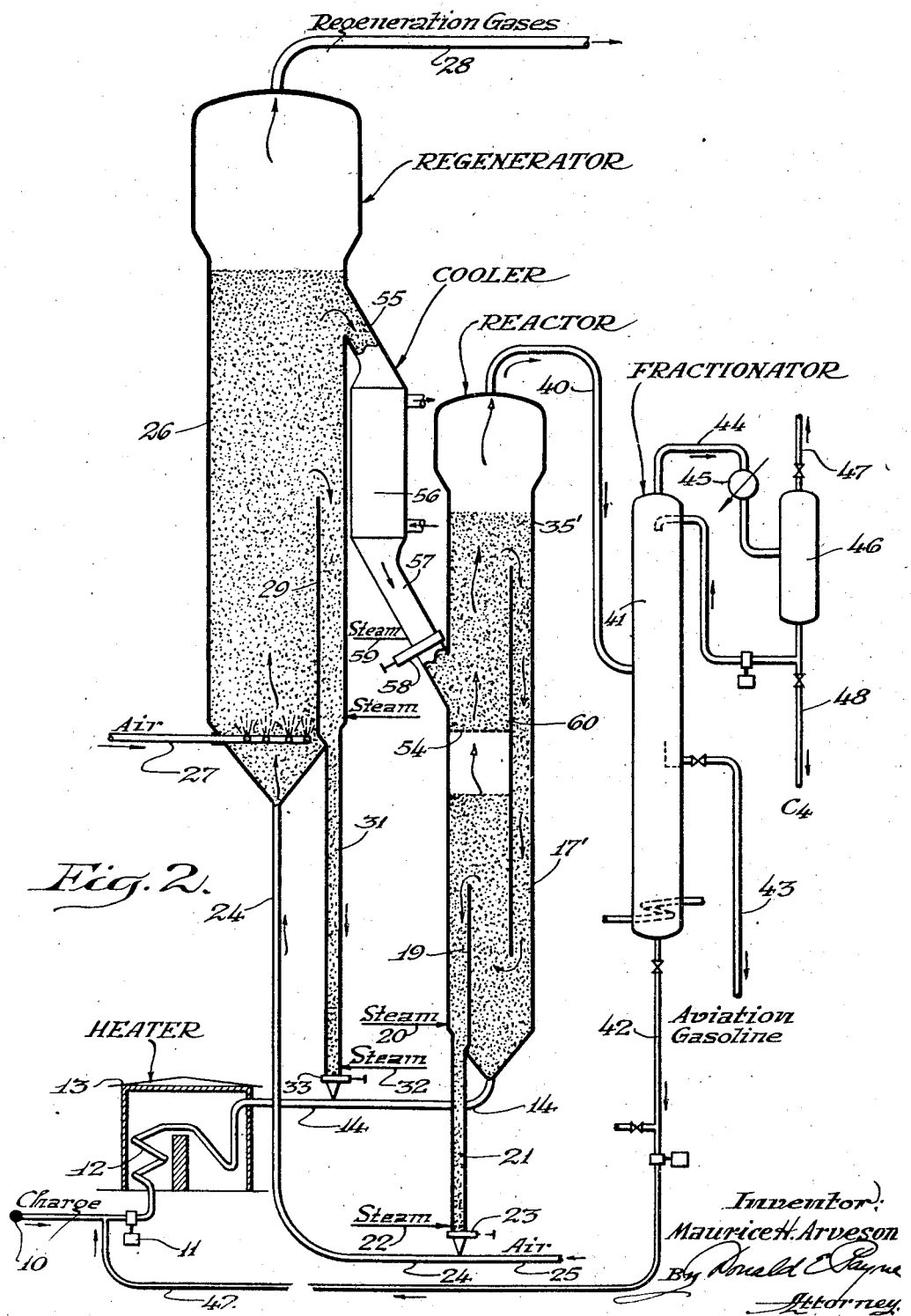
Figure 3:
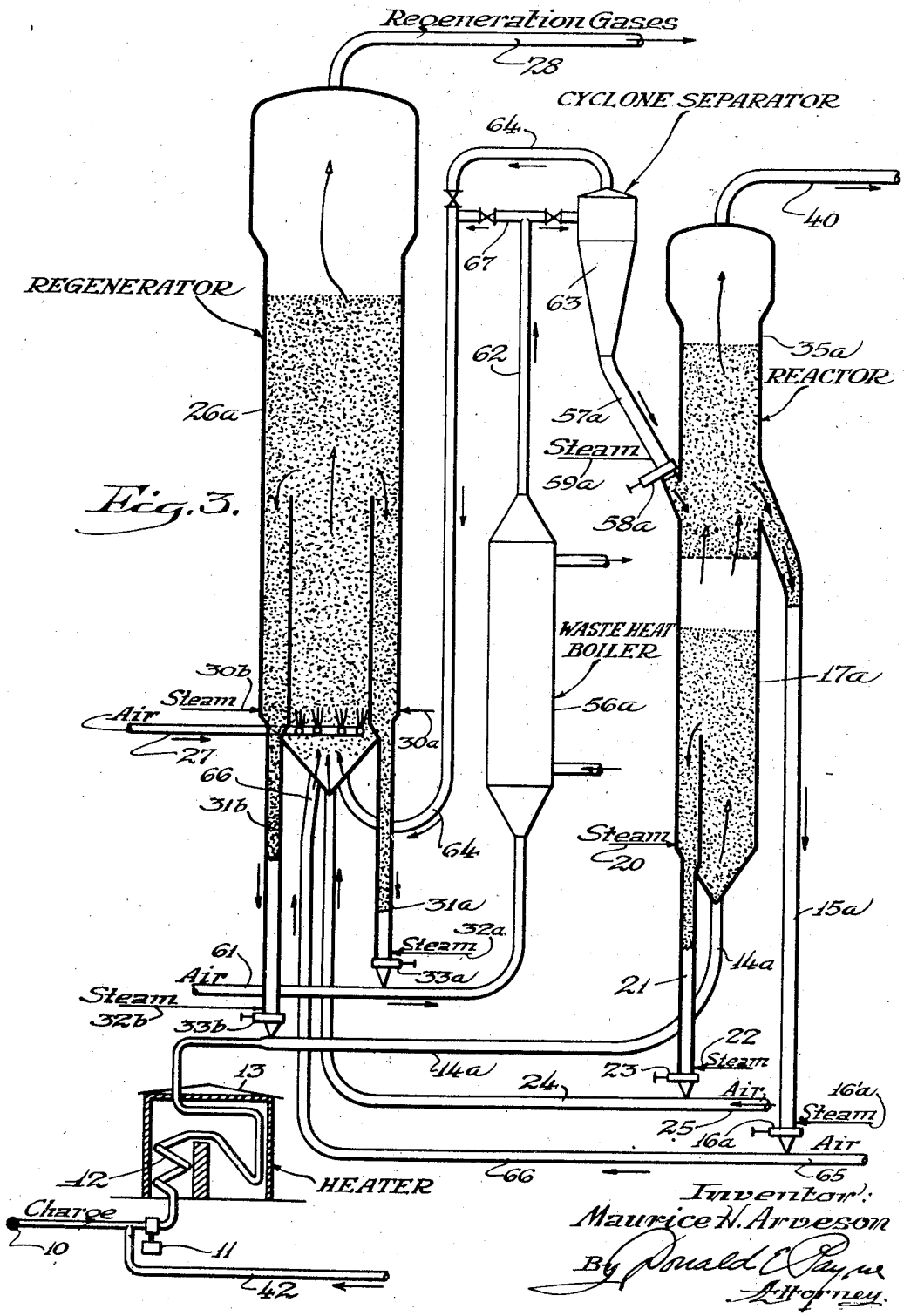

The invention will be more clearly understood from the following detailed description of specific examples of my invention read in conjunction with the accompanying drawings which form a part of the specification and in which:

Figure 1 is a schematic flow diagram of a stage-countercurrent system for the production of aviation gasoline, Figure 2 is a schematic flow diagram of a semi-countercurrent system employing a waste heat boiler, and Figure 3 is a schematic flow diagram illustrating a still different arrangement of conversion zones with the catalyst cooling and regeneration zones.

For catalytic cracking, I prefer to employ catalyst of the silica-alumina type. One example of such catalyst is acid treated montmorillonite clay commonly marketed as Super Filtrol. Another example is a synthetic catalyst consisting essentially of activated silica with alumina either with or without additional metal oxides or fluosilicates. Such a catalyst may be prepared by ball milling silica hydrogel with alumina using about 2 to 30%, for example about 15%, of alumina. The ball milled dough may be dried at a temperature of about 240° F. and then activated by heating to a temperature of about 900 to 1000° F. Another method of preparing a highly active cracking catalyst is to form a gel from dilute sodium silicate in the presence of an aluminum salt by the addition of excess dilute sulfuric acid. The resulting gel is boiled for an hour or two with an excess of ammonium hydroxide solution before washing, after which it is dried and heated as in the previous example. The silica-alumina catalyst may be rendered more stable at high temperatures by the addition thereto of zirconia or aluminum fluosilicate. Thoria, beryllium oxide or other metal oxides may also be included in the composition. My invention is not limited to the use of any particular catalyst and since no invention is claimed in the catalyst per se a further description thereof is unnecessary.

In these specific examples the catalyst is in powdered form with a particle size of about 10 to 100 microns. The invention is applicable to other catalyst sizes provided only that the catalyst be of such size and density that it may be aerated and handled as a fluid in the manner herein described. The bulk density of such catalyst which has settled for 5 or 10 minutes will usually range from 30 to 45 pounds per cubic foot. With slight aeration, i. e., with gas or vapor velocities of about .05 to .5 feet per second, the bulk density of this catalyst is about 25 to 35 pounds per cubic foot and under such conditions the catalyst is referred to as "aerated catalyst." With vapor velocities of about 1 to 2 or 3 feet per second the bulk density of such catalyst may be from 10 to 25 pounds per cubic foot. It is at such gas or vapor velocities that the powdered catalyst is maintained in the dense turbulent suspended catalyst phase which has been found most satisfactory for effecting cracking, treating and regeneration. With higher and higher vapor velocities the bulk density becomes less and less. In zones above the level of dense phase catalyst in cracking, treating or regeneration zones, the average bulk density of catalyst is usually less than 1 pound per cubic foot and at such conditions the catalyst is said to be in the dilute, light or dispersed phase. This dilute phase may contain only about 50 grains or less of catalyst material per cubic foot.

The charging stock for my process may be a heavy naphtha or light gas oil, i. e., a hydrocarbon boiling within the approximate range of 300 to 650° F.; a preferred boiling range is about 350 to 550° F. but the end point may be as high as 700° F. or even higher. Instead of virgin charging stock I may employ cracked stocks or the so-called cycle stocks, i. e., hydrocarbons which have been produced in a previous thermal or catalytic conversion system. Also, I may employ hydrocarbons produced by the hydrogenation of carbonaceous materials or by the synthesis of carbon monoxide with hydrogen (the so-called Fischer process) or from any other source.

This charging stock is passed from source 10 by pump 11 through coils 12 of pipe still 13 which may be fired to give a temperature in transfer line 14 (after the addition of hot catalyst) within the approximate range of 750 to 950° F., for example about 825° F. Catalyst from standpipe 15 is introduced into transfer line 14 in amounts regulated by valve 16 in such amounts as to give a catalyst-to-oil weight ratio of about 1:1 to 10:1 for example about 5:1. The catalyst thus suspended in the charging stock stream is introduced at the base of primary reactor or cracking chamber 17 which may operate at slightly superatmospheric pressure, i. e., from about atmospheric to about 50 pounds per square inch. The size and diameter of chamber 17 should be such as to produce a vertical vapor velocity therein of about 1 to 2 or 3 feet per second and to give a weight space velocity of about 1 to 5, for example about 2 weight units of oil charged to the reactor per hour per weight unit of catalyst maintained in the reactor. The catalyst holding time in the reactor may range from about 10 seconds to 10 minutes. The temperature in the reactor will be substantially the same throughout all parts thereof and should be within the approximate range of 750 to 925° F., for example about 825° F. Catalyst settles out of the vapors which leave the top of the dense turbulent phase in the enlarged upper part of cracking chamber 17 and the primary reaction vapors are taken overhead through line 18.

Catalyst is withdrawn from the dense phase in the reactor through stripping zone 19, which is supplied with stripping steam through line 20, and thence through standpipe 21 which is aerated by steam introduced through line 22. Catalyst is discharged from the base of this standpipe through valve 23 to line 24 and is carried by air introduced by line 25 to regenerator 26 which is similar to cracking chamber 17 but considerably larger in size. For example, the diameter of the regenerator may be about half again as great as the diameter of chamber 17 and the regenerator may be twice as high as the cracking chamber. Air introduced through line 27 burns carbonaceous deposits from the catalyst while the catalyst is maintained in dense phase turbulent suspension. The temperature in the regenerator should be maintained within safe limits usually not higher than about 1050° F. and may, for example, be about 1000° F. although safe limits will, of course, depend upon the particular catalyst employed. Where a large amount of carbonaceous deposit must be burned from the catalyst, means may be employed for removing excess heat of regeneration. Heat exchange coils may be mounted in the regenerator itself or catalyst may be recycled from the regenerator to a cooler and thence back to the regenerator.

The regeneration gases which leave the dense turbulent suspended catalyst phase pass through the enlarged upper zone of the regenerator so that any entrained catalyst particles may settle back to the suspended catalyst phase. The gases are then removed through line 28 through suitable waste heat boilers or other devices for recovering available energy. Filters, scrubbers, electrostatic precipitators or any other commercial means may be employed for recovering the last traces of catalyst from the regeneration gases and this recovered catalyst may be returned to the regenerator together with make-up catalyst by any suitable injection means (not shown). The amount of catalyst in the regenerator or in a conversion zone may be readily determined by the pressure differential between the bottom and top thereof and make-up catalyst should be added from time to time to maintain a substantially constant catalyst inventory in the system.

Regenerated catalyst is withdrawn from the dense phase in regenerator 26 through stripping zone 29, which is supplied with stripping steam through line 30, and thence through standpipe 31, which is aerated by steam introduced through line 32. Catalyst is discharged from the base of this standpipe through valve 33 to line 34 and is carried to secondary reactor or treating chamber 35 by the conversion products which leave primary reactor 17 through lines 18 and 36. If these products contain any hydrocarbons which might condense at the temperatures and pressures prevailing in reactor 35 they may be by-passed through cooler 37 to separator 38, the higher boiling components being withdrawn from the system or recycled to pump 11 through line 39 and the uncondensed vapors passing through line 40 back to line 36.

The catalyst in standpipe 31 may be cooled by heat exchanger of any desired type (as exemplified for instance by heat exchangers described in my copending application Serial 372,518) so that the transfer line temperature in line 34 is within the approximate range of 500 to 700°, for example about 600 to 650° F. The catalyst-to-oil weight ratio in transfer line 34 may be approximately the same as in transfer line 14, i. e., about 5:1 or within the approximate range of 1:1 to 10:1. The size and diameter of chamber 35 should be such as to produce a vertical vapor velocity therein of about 1 to 2 or 3 feet per second and to give a weight space velocity within the approximate range of about 1 to 10, for example about 2 weight units of oil charged to the reactor per hour per weight unit of catalyst material maintained in the reactor. The catalyst holding time in reactor 35 may range from about 10 seconds to about 10 minutes. The temperature in this reactor will be substantially the same throughout all parts thereof and should be within the approximate range of 500 to 700° F., for example about 625° F.

Catalyst settles out of the vapors which leave the top of the dense turbulent phase in the enlarged upper part of chamber 35 and the secondary reaction vapors are taken overhead through line 40 to fractionation system schematically illustrated by fractionating tower 41. A heavy fraction which may contain catalyst particles is withdrawn through line 42 and may be recycled to pump 11. This fraction may contain all components boiling above 300° F. and may constitute slightly more than half of the original charge.

The butanes and lighter gases may be taken overhead through line 44, through cooler 45 to receiver 46 from which propanes and lighter gases are vented through line 47 and the $C_4$ hydrocarbons which are not required for reflux are withdrawn through line 48. In actual practice, of course, separate towers will be employed for the separation of cycle oil from gasoline, for the stabilization of the gasoline, and perhaps for the separation of $C_4$ from lighter hydrocarbons but since the fractionation system per se forms no part of my invention it will not be described in further detail.

In the above system the catalyst leaving the base of standpipe 31 is cooled to about 650° F. and the catalyst leaving the base of standpipe 15 is heated to a temperature of about 850° F. to 950° F. This heat exchange may be effected by passing a heat transfer medium such as mercury, a molten metal, a fused salt mixture or the like upwardly through or around standpipe 31 in conduit 49 so that it reaches the temperature of almost 1000° F. This hot heat transfer agent is then passed by insulated line 50 to the base of standpipe 15 and is then passed upwardly through or around this standpipe in conduit 51 so that it leaves the top of the standpipe and enters pipe 52 at a temperature of about 650° F. The heat transfer agent is circulated in this closed system by means of pump 53. It should be understood, however, that instead of employing a heat transfer agent as hereinabove described I may effect the countercurrent heat exchange by any other known method whether the catalyst is in dense phase or is carried as a dilute phase in a high velocity gaseous medium.

It will thus be seen that in the system illustrated in Figure 1 the freshly regenerated catalyst is cooled to about 500 to 700° F. and contacted with cracked products in a secondary conversion zone, then heated to a temperature of about 750 to 950° F. and contacted with charging stock vapors in the primary conversion zone, the products from the primary conversion zone serving as charging stock for the secondary conversion zone. The over-all catalyst-to-oil weight ratio in these conversion steps may be within the general vicinity of 5 or within the approximate range of 1 to 10. The over-all weight space velocity may be about ½ to 2 or more pounds of charging stock per hour per pound of catalyst material in the combined conversion zones at any instant. The catalyst residence time-weight space velocity relationship for equal conversion in the combined zones may be expressed as follows:

Weight space velocity = $\dfrac{b}{(\text{residence time in minutes})^{.534}}$ where $b$ is a constant which with comparatively fresh catalyst lies within the approximate range of about .8 to 8 and may be for example about 4.

The weight space velocity is based on total catalyst in both zones and the residence time is the sum of the residence times in the two zones. The greater the relative conversion which is effected in the low temperature zone, the lower will be the value of $b$. The higher the temperature in the conversion zones the higher will be the value of $b$.

The amount of conversion which is effected in the two zones may vary within relatively wide limits. Thus with an over-all weight catalyst-to-oil feed ratio of 5 an over-all weight space velocity of about 1 and an over-all residence time of about 10 minutes, I may employ a residence time in each zone of about 5 minutes and a weight space velocity in each zone of about 2. On the other hand, I may employ a weight space velocity in the high temperature zone of about 1.1 and a weight space velocity in the low temperature zone of about 10 in which case the catalyst residence time in the high temperature zone will be about 9 minutes while the catalyst residence time in the low temperature zone will be about 1 minute. The operating conditions will depend, of course, on the specific catalyst employed, the nature of the particular charging stock and the particular conversion which is to be effected.

Referring now to Figure 2, I may mount the secondary reactor 35' immediately above the primary reactor 17' so that the reaction product gases leaving the top of the primary reactor pass directly through a suitable grating or distributor 54 into the base of the secondary reactor. In this case catalyst is withdrawn from the upper part of the regenerator through conduit 55, through a cooler or waste heat boiler 56 and is then introduced through conduit 57 directly into the secondary reactor 35'. The flow of catalyst into the reactor may be controlled by valve 58 and an aeration gas may be introduced through line 59. This aeration gas may also serve as a stripping medium to remove oxygen from the regenerated catalyst stream. Cooler 56 may consist of a waste heat boiler for the generation of steam or any desired heat exchange fluid may be utilized for cooling the downwardly flowing catalyst to a temperature of about 500 to 700° F.

In Figure 2 catalyst is transferred from the dense phase in secondary reactor 35' through standpipe 60 directly to the dense phase in primary reactor 17'. Additional catalyst for this primary conversion zone is introduced from standpipe 31 through transfer line 14. Since the catalyst introduced from standpipe 31 is at about 1000° F. and the catalyst introduced from standpipe 60 is about 650° F., I may obtain a temperature of about 825° F. in the primary conversion zone by supplying about half of the catalyst therefrom from each source. The over-all operating conditions in this example will be substantially the same as in the previous example and will require no further detailed description. In this case as in the previous example, it is fresh cooled regenerated catalyst which is introduced into the secondary reaction zone and catalyst from this secondary reaction zone is then introduced into the primary conversion zone before it is returned to the regenerator. Also the products leaving the primary regeneration zone at high temperature are passed immediately through the low temperature conversion zone and contacted with fresh catalyst for effecting the further conversion, desired reduction in olefin content, and isomerization of the desired aviation fuel.

In Figure 3 I have shown still another embodiment of the invention wherein secondary reactor 35a is superimposed above primary reactor 17a but in this case the regenerated catalyst for the secondary reactor is withdrawn through standpipe 31a, picked up by air introduced through line 61 and conveyed at high velocity through heat exchanger or waste heat boiler 56a for reducing the temperature of the catalyst to a temperature of the order of 500 to 700° F., for example about 625° F. and the catalyst is then discharged by line 62 into cyclone separator 63 from the base of which catalyst is introduced into the secondary reactor through line 57a, in amounts regulated by valve 58a. The separation in the cyclone separator need not be particularly efficient because the conveyor gas and suspended catalyst particles are returned by line 64 to the base of regenerator 26a. In this case the catalyst for the primary conversion zone is picked up by charging stock vapors from the base of standpipe 31b and the charging stock is introduced at a sufficiently low temperature so that the catalyst suspension in line 14a will be at a temperature of 750 to 950° F. for example about 825° F. The catalyst in standpipe 31b may be cooled by charging stock prior to the injection of the catalyst into charging stock vapors. Alternatively, the catalyst may be injected into line 14a by means of steam and the charging stock may be introduced while it is at least partially in liquid form so that the contained heat of the catalyst may effect vaporization of at least a portion of the charging stock as well as bringing the vapors to primary reaction temperature. It should be stated that steam may be employed in both conversion processes and the vapor velocities therein may be regulated by varying the amounts of steam introduced.

In the embodiment shown in Figure 3 the catalyst removed from the secondary conversion zone through standpipe 15a is picked up by air introduced through line 65 and returned through line 66 directly to the regenerator. It will be noted that the cooled catalyst has served the additional function of effecting the reaction in the secondary reaction zone for regulating the temperature therein. If desired, a part of the cooled catalyst may be returned directly to the regenerator through by-pass line 67 so that temperature control in the regenerator may be effected and the desired conversion conditions may be maintained in the secondary conversion zone by simply regulating the total amount of catalyst which is passed through the cooler and the amounts of catalyst passing through lines 57a and 64 respectively.

While I have described preferred examples of my invention it should be understood that the invention is not limited to any of the particular arrangements or operating conditions hereinabove described since many modifications of this system and many alternative operating conditions will be apparent to those skilled in the art from the above detailed description.

I claim:

1. The method of converting a hydrocarbon charging stock having a boiling range within the approximate limits of 300° F. to 700° F. into substantial yields of a gasoline fraction of low acid heat and low olefin content suitable for use in aviation engines which method comprises contacting said charging stock with a powdered cracking catalyst in a primary reaction zone at a temperature within the approximate range of 750 to 950° F., passing catalyst from said primary reaction zone to a regeneration zone and regenerating said catalyst in said regeneration zone, withdrawing regenerated catalyst from said regeneration zone to a cooling zone to lower the temperature of said withdrawn catalyst to a temperature within the approximate range of 500 to 750° F., contacting products from said primary reaction zone with said cooled catalyst in a secondary reaction zone, removing catalyst from the secondary reaction zone, heating said removed catalyst, introducing the heated catalyst into said primary reaction zone before returning it to the regeneration zone, and fractionating the products leaving the secondary reaction zone to obtain a gasoline fraction and lighter and heavier fractions respectively.

2. The method of operating a multi-stage conversion system employing powdered catalyst which method comprises contacting a charging stock with suspended powdered catalyst first in a primary high temperature stage and then in a secondary low temperature stage, regenerating catalyst which has become partially spent in said primary stage by said high temperature contacting step, cooling freshly regenerated catalyst, passing freshly regenerated catalyst from the cooling step to said secondary stage, heating catalyst from the secondary stage, and introducing catalyst from the heating step into said primary stage.

3. In a fluid-type catalytic conversion system wherein the charging stock is treated with catalyst in at least two stages, the method of operation which comprises passing a charging stock first through a primary stage at a temperature within the approximate range of 750 to 950° F. and then through a secondary stage at a temperature within the approximate range of 500 to 700° F., regenerating catalyst which has become partially spent in said primary stage, cooling said regenerated catalyst, introducing cooled regenerated catalyst into the secondary stage, introducing hot powdered catalyst into the primary stage and effecting the cooling of the regenerated catalyst by heat exchange with catalyst from the secondary stage.

4. The method of claim 3 which includes the further step of obtaining countercurrent heat exchange between hot regenerated catalyst and cool catalyst from the secondary stage.

5. The method of operating a multi-stage catalytic conversion system of the fluid type which method comprises regenerating substantially spent catalyst in a regeneration zone, passing one stream of hot regenerated catalyst from said regeneration zone to a primary conversion zone, passing another stream of freshly regenerated catalyst from said regeneration zone to a cooling zone, passing a part of said cooled regenerated catalyst to a secondary conversion zone, returning another part of the cooled regenerated catalyst directly from the cooling zone to the regeneration zone for maintaining the temperature thereof within safe limits, and passing a charging stock first through said primary conversion zone and then through said secondary conversion zone.

6. The method of making a gasoline of low acid heat and low olefin content which method comprises contacting a heavier-than-gasoline hydrocarbon charging stock with a finely divided solid cracking catalyst while maintaining said catalyst suspended in charging stock vapors in a first contacting zone under conditions for effecting catalytic cracking of said charging stock, separating the products from the bulk of the catalyst, regenerating the separated catalyst by the combustion of carbonaceous material therefrom at a temperature higher than the temperature maintained in the first contacting zone, separating regenerated catalyst from regeneration gases, cooling at least a part of the regenerated catalyst to a temperature substantially lower than the temperature maintained in said first contacting zone, contacting said cooled regenerated catalyst with gasiform hydrocarbons removed from said first contacting zone by passing said gasiform hydrocarbons upwardly in a second contacting zone through a mass of said cooled catalyst at a rate to maintain said cooled catalyst in dense phase suspension and under conditions for decreasing the olefin content of the hydrocarbons in said gasiform stream, separating catalyst from the gasiform stream in the second contacting zone, heating said separated catalyst and introducing said heated catalyst into said first contacting zone.

7. The method of operating a multi-stage catalytic conversion system of the fluid type which method comprises regenerating substantially spent catalyst in a regeneration zone, passing one stream of hot regenerated catalyst from said regeneration zone to a primary conversion zone, passing another stream of freshly regenerated catalyst from said regeneration zone to a cooling zone and thence to a secondary conversion zone, passing a charging stock first through said primary conversion zone and then through said secondary conversion zone, and introducing catalyst directly from the secondary conversion zone to the primary conversion zone for maintaining the desired temperature level therein.

MAURICE H. ARVESON.

REFERENCES CITED

The following references are of record in the file of this patent:

UNITED STATES PATENTS

| Number | Name | Date |
| --- | --- | --- |
| 1,577,534 | Miller | Mar. 23, 1926 |
| 2,277,938 | Subkow | Mar. 31, 1942 |
| 2,290,580 | Degnen et al. | July 21, 1942 |
| 2,300,032 | Kassel | Oct. 27, 1942 |
| 2,297,774 | Kanhofer | Oct. 6, 1942 |
| 2,311,564 | Munday | Feb. 16, 1943 |
| 2,304,128 | Thomas | Dec. 8, 1942 |
| 2,357,136 | Rubin | Aug. 29, 1944 |